United States Patent
Sato et al.

(10) Patent No.: US 10,441,943 B2
(45) Date of Patent: Oct. 15, 2019

(54) CATALYST FOR HYDROGEN PEROXIDE DECOMPOSITION, PROCESS FOR PRODUCING THE SAME, AND METHOD FOR DECOMPOSING HYDROGEN PEROXIDE USING THE CATALYST

(71) Applicant: TANAKA KIKINZOKU KOGYO K.K., Tokyo (JP)

(72) Inventors: Hiroyasu Sato, Kanagawa (JP); Jun Watanabe, Kanagawa (JP); Matsunori Sawada, Kanagawa (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 148 days.

(21) Appl. No.: 15/534,601

(22) PCT Filed: Dec. 10, 2015

(86) PCT No.: PCT/JP2015/084724
§ 371 (c)(1),
(2) Date: Jun. 9, 2017

(87) PCT Pub. No.: WO2016/093329
PCT Pub. Date: Jun. 16, 2016

(65) Prior Publication Data
US 2017/0341060 A1 Nov. 30, 2017

(30) Foreign Application Priority Data
Dec. 11, 2014 (JP) .................... 2014-251315

(51) Int. Cl.
*B01J 23/652* (2006.01)
*B01J 23/68* (2006.01)
(Continued)

(52) U.S. Cl.
CPC ......... *B01J 23/6527* (2013.01); *B01J 23/652* (2013.01); *B01J 23/6525* (2013.01);
(Continued)

(58) Field of Classification Search
CPC .. B01J 23/652; B01J 23/6525; B01J 23/6527; B01J 23/687; B01J 37/0225; B01J 37/06;
(Continued)

(56) References Cited

U.S. PATENT DOCUMENTS 4,683,065 A * 7/1987 Sheikh ................ C02F 1/281
                                                            210/668
6,136,186 A * 10/2000 Gonzalez-Martin ..................
                                                            B01D 53/864
                                                            210/198.1
(Continued)

FOREIGN PATENT DOCUMENTS

JP   S62-033548   2/1987
JP   2003-266081  9/2003
(Continued)

OTHER PUBLICATIONS

JP, International Search Repoert concerning PCT/JP2015/084724, dated Mar. 8, 2016.
(Continued)

*Primary Examiner* — Lucas A Stelling
(74) *Attorney, Agent, or Firm* — Orrick, Herrington & Sutcliffe LLP; Joseph A. Calvaruso; K. Patrick Herman

(57) ABSTRACT

The present invention provides a catalyst for hydrogen peroxide decomposition with which hydrogen peroxide present in acid-containing water to be treated can be efficiently decomposed at low cost and which is less apt to dissolve away in the water being treated, can be stably used over a long period, and renders acid recovery and recycling possible. The present invention has solved the problems with
(Continued)

a catalyst for hydrogen peroxide decomposition which is for use in decomposing hydrogen peroxide present in acid-containing water to be treated, the catalyst including a base and, a catalyst layer that is amorphous, includes a platinum-group metal having catalytic function and a Group-6 element metal having catalytic function and is formed over the base.

12 Claims, 3 Drawing Sheets

(51) Int. Cl.
  B01J 37/02 (2006.01)
  B01J 37/06 (2006.01)
  B01J 37/34 (2006.01)
  C02F 1/70 (2006.01)
  C02F 1/72 (2006.01)
  C25D 3/48 (2006.01)
  C25D 3/50 (2006.01)
  C25D 3/54 (2006.01)
  C25D 3/56 (2006.01)
  C25D 5/10 (2006.01)
  C25D 5/38 (2006.01)
  C02F 101/10 (2006.01)
  C02F 103/34 (2006.01)

(52) U.S. Cl.
  CPC ......... B01J 23/687 (2013.01); B01J 37/0225 (2013.01); B01J 37/348 (2013.01); C02F 1/705 (2013.01); C02F 1/725 (2013.01); C25D 3/48 (2013.01); C25D 3/50 (2013.01); C25D 3/54 (2013.01); C25D 3/567 (2013.01); C25D 5/10 (2013.01); C25D 5/38 (2013.01); *B01J 37/06* (2013.01); *C02F 2101/10* (2013.01); *C02F 2103/346* (2013.01)

(58) Field of Classification Search
  CPC . B01J 37/348; C02F 1/66; C02F 1/705; C02F 1/725; C02F 2103/346; C02F 2101/10; C25D 3/48; C25D 3/50; C25D 3/54; C25D 3/567; C25D 5/10; C25D 5/38
  See application file for complete search history.

(56) References Cited

U.S. PATENT DOCUMENTS 6,156,211 A * 12/2000 Gonzalez-Martin ........................ B01D 53/864
  204/157.9
2004/0229752 A1* 11/2004 Long ................. B01D 53/0407
  502/303

FOREIGN PATENT DOCUMENTS

| JP | 2007-090157 | 4/2007 |
| JP | 2010-105864 | 5/2010 |
| JP | 2010-185136 | 8/2010 |
| JP | 2010-214320 | 9/2010 |
| JP | 2011-200771 | 10/2011 |
| JP | 2013-013868 | 1/2013 |

OTHER PUBLICATIONS

JP, ISR/ISA/237 concerning PCT/JP2015/084724, dated Mar. 8, 2016.

Mikhailova A. A., et al., CO oxidation at platinum-molybdenum electrodes, Russian Journal of Electrochemistry, Mar. 2008, ISSN:1023-1935, vol. 44(3), pp. 303-312.

Kim Jungwon, et al., Platinized WO3 as an Environmental Photocatalyst that Generates OH Radicals under Visible Light, Environ. Sci. Technol., Aug. 10, 2010, ISSN:1520-5851, vol. 44(17), pp. 6849-6854.

* cited by examiner

[Fig. 1]
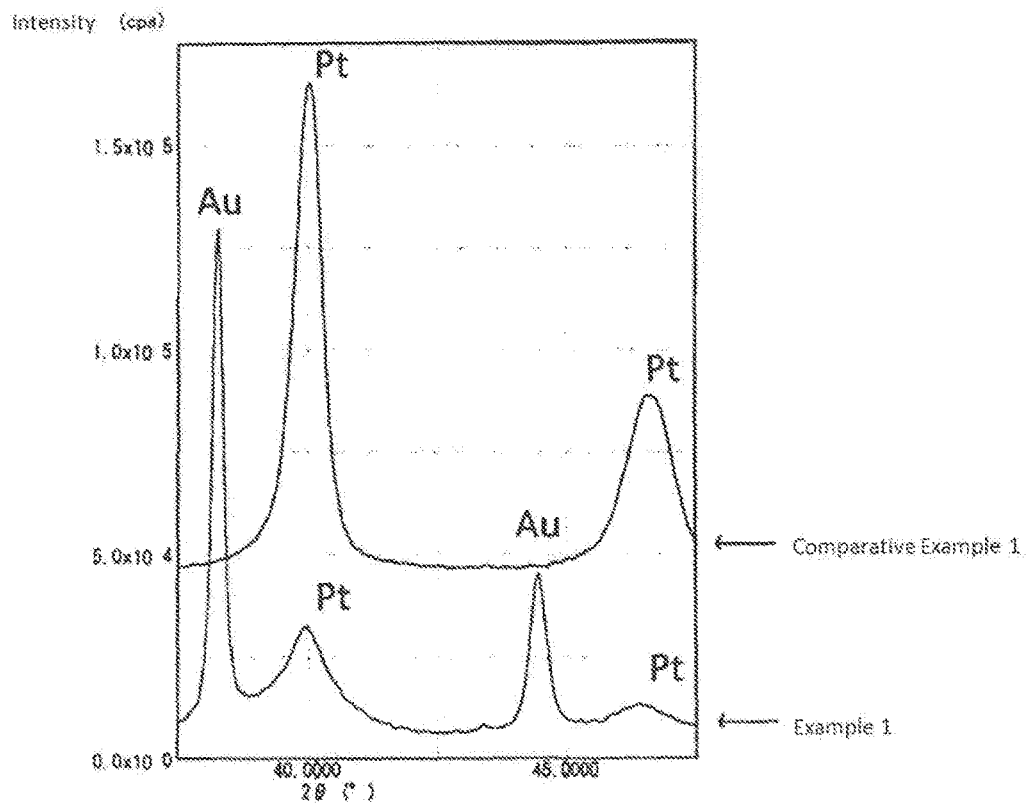
[Fig. 2]
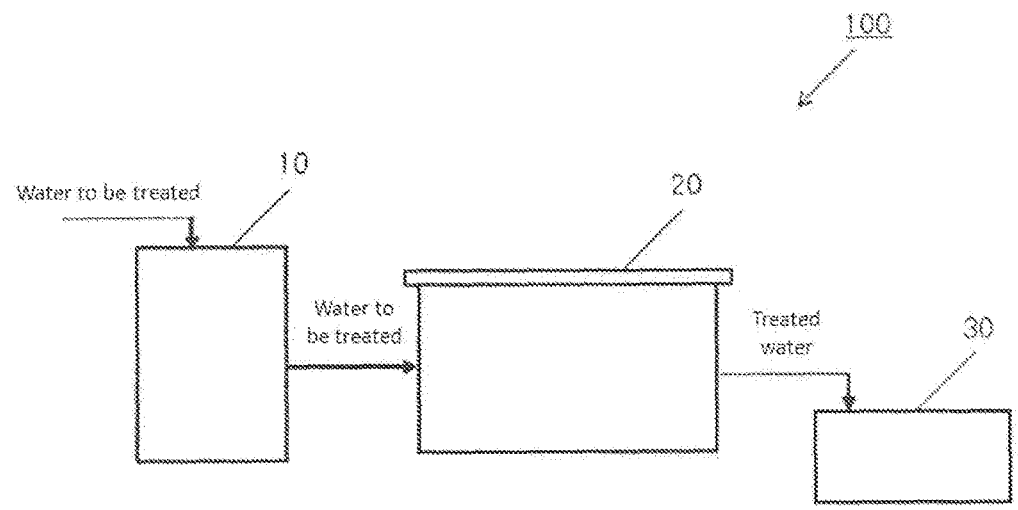

[Fig. 3]
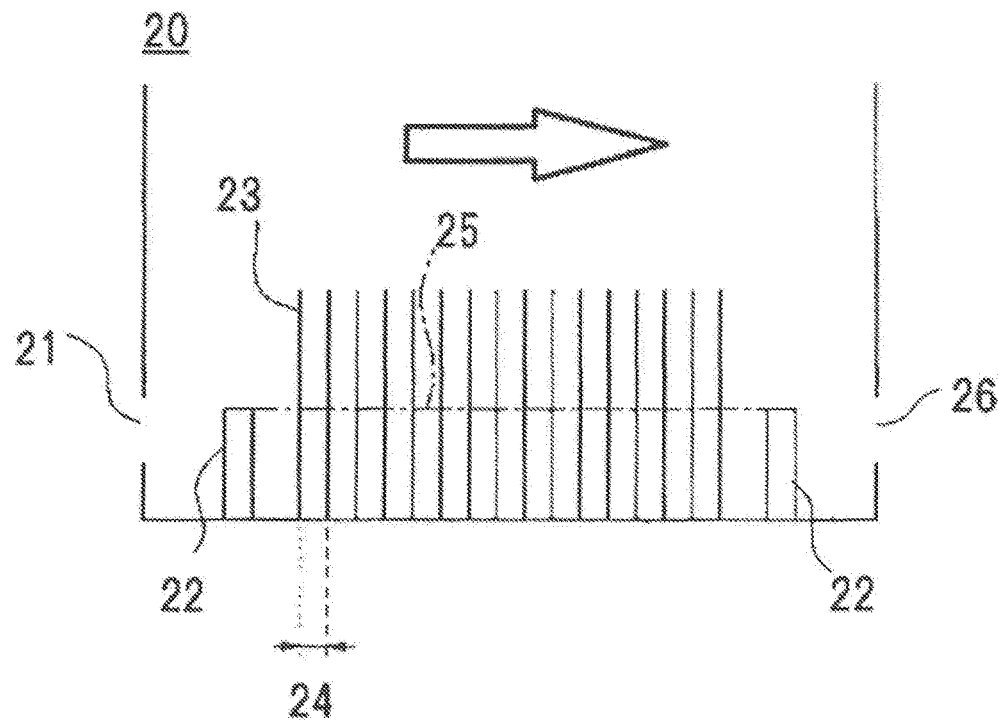
[Fig. 4]
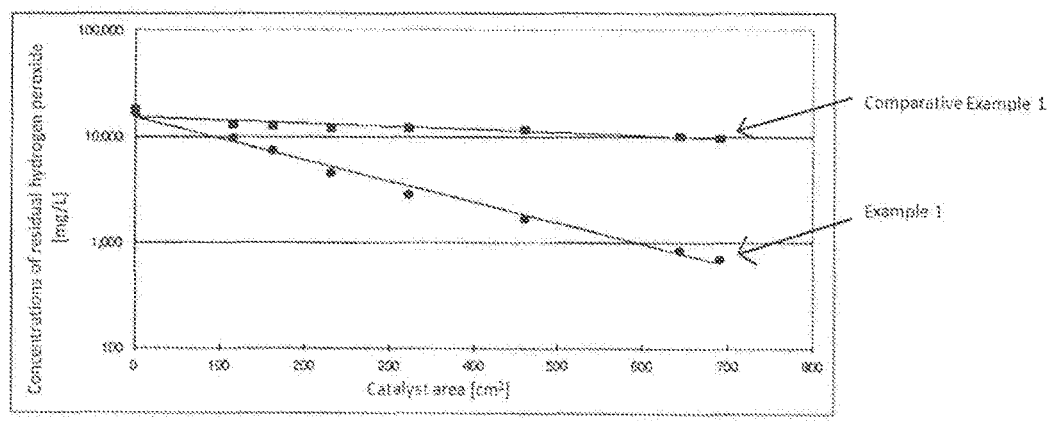

[Fig. 5]
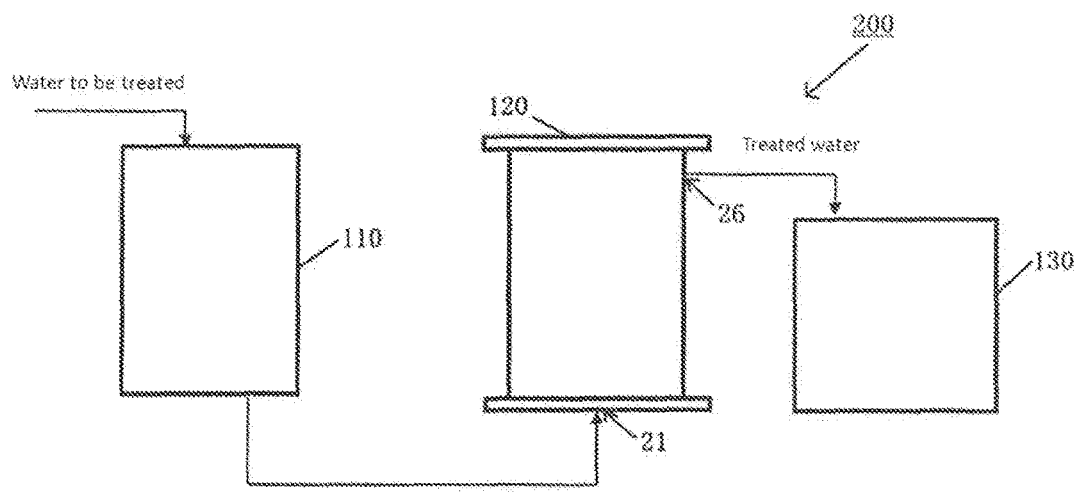
[Fig. 6]
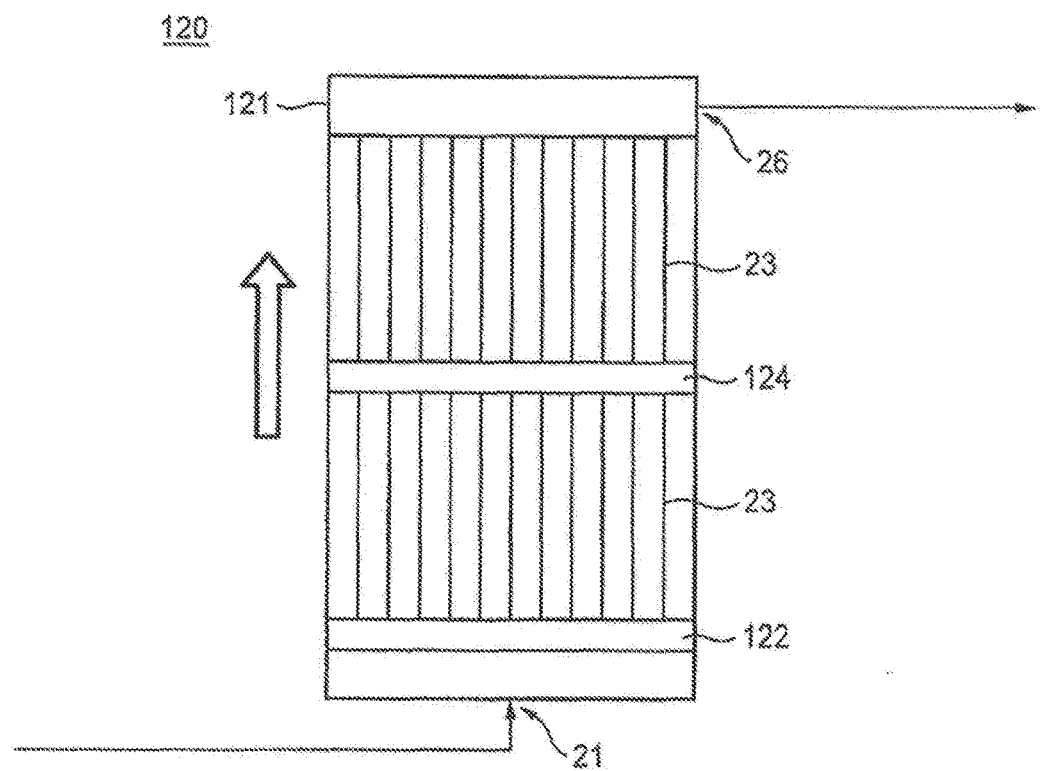

CATALYST FOR HYDROGEN PEROXIDE DECOMPOSITION, PROCESS FOR PRODUCING THE SAME, AND METHOD FOR DECOMPOSING HYDROGEN PEROXIDE USING THE CATALYST

TECHNICAL FIELD

The present invention relates to a catalyst for hydrogen peroxide decomposition, a process for producing the catalyst, and a method for decomposing hydrogen peroxide using the catalyst.

BACKGROUND ART

In steps for semiconductor production, a treating liquid containing an acid (e.g., sulfuric acid) and hydrogen peroxide is used in silicon wafer pretreatment, etc. As this treating liquid is repeatedly used, accumulation of impurities such as silica and decomposition of the hydrogen peroxide proceed to lower the acid concentration, resulting in a decrease in treatment function. It is hence necessary to renew the treating liquid intermittently. Because of this, a waste liquid having a high acid concentration and containing residual hydrogen peroxide is discharged in a large quantity. The amount of this waste liquid is affected by the regulations of the industrial waste management law.

Consequently, it becomes important to develop a technique by which the hydrogen peroxide remaining in the waste liquid is safely decomposed to a recycling level and which enables the concentrated acid (e.g., sulfuric acid) in the waste liquid to be recovered and be recycled or sold. In cases when the hydrogen peroxide is decomposed and the remaining acid is thereafter treated by neutralization, then there are cases where separation of the sediment yielded by the neutralization becomes difficult because the sediment rises up due to the remaining hydrogen peroxide.

Examples of techniques for decomposing the hydrogen peroxide using a catalyst include the following patent documents 1 to 4.

Patent document 1 discloses a hydrogen peroxide decomposition catalyst produced by forming a porous alumina coating film on the surface of a metal plate and fixing noble-metal colloidal particles having a particle diameter of 5 nm or less to the porous alumina coating film.

Patent document 2 discloses a catalyst which is a hydrogen peroxide decomposition catalyst for decomposing hydrogen peroxide present in a liquid phase into water and oxygen and which includes a support made of an inorganic oxide material having pores and one or more active metals fixed to the support and including at least one metal selected from the group consisting of Pt, Pd, Ir, Ru, Rh, and Os, the layer where the active metals have been fixed in the vicinity of the surface of the support having a thickness of 0.01-0.25 mm.

Patent document 3 discloses activated carbon for hydrogen peroxide decomposition which is a material for hydrogen peroxide decomposition obtained by kneading and dispersing an activated-carbon precursor and either at least one metal selected from among Ag, Pt, Pd, Cu, and Fe or a compound of the metal, infusibilizing and/or carbonizing the resultant mixture, and then activating the mixture, and in which the content of the metal component is 0.01% by mass or higher.

Patent document 4 discloses a supported platinum-group metal catalyst which includes an organic porous anion exchanger and, supported thereon, nanoparticles of a platinum-group meal having an average particle diameter of 1-100 nm. This catalyst is characterized in that the organic porous anion exchanger has an interconnected-pore structure having both macropores communicating with one another and common openings (meso-pores) formed in the walls of the macropores and having an average dry-state diameter of 1-1,000 µm, has a total pore volume of 1-50 mL/g, has anion exchange groups evenly distributed therein, and has an anion exchange capacity of 0.5-5.0 mg-eq/g-(dry porous object) and that the amount of the supported platinum-group metal is 0.004-20% by weight in terms of dry-state amount.

PRIOR-ART DOCUMENTS

Patent Documents

Patent Document 1: JP-A-2011-200771
Patent Document 2: JP-A-2013-13868
Patent Document 3: JP-A-2003-266081
Patent Document 4: JP-A-2010-214320

SUMMARY OF THE INVENTION

Problems that the Invention is to Solve

However, solutions which are mixtures of an acid, such as sulfuric acid, with aqueous hydrogen peroxide solution are extensively used not only in semiconductor production processes such as those shown above but also in various fields, and the acid concentrations in the resultant waste liquids vary over a wide range. The conventional techniques described above cannot accommodate all of the acid concentrations in a wide range. For example, in the case of waste liquids containing sulfuric acid in a high concentration, there is a problem in that the surface of the porous material is covered with a large amount of sulfate ions and, hence, the hydrogen peroxide is less apt to come into contact with the catalyst, making it impossible to attain efficient decomposition. There also is a problem in that in cases when the catalyst is immersed in high-concentration sulfuric acid for a prolonged period, the catalyst itself dissolves away undesirably.

Besides the techniques disclosed in the patent documents shown above, a large number of conventional techniques are known in which a chemical, e.g., sulfurous acid, light irradiation, steam, high pressure, or the like is applied when decomposing hydrogen peroxide. However, in cases when such means are used for decomposing hydrogen peroxide, which is relatively expensive, a considerable increase in treatment cost results.

In addition, among prior-art techniques, there are few techniques which have been disclosed so far and which are for recovering and recycling the acid, such as sulfuric acid, remaining after the decomposition of the hydrogen peroxide.

Consequently, an object of the invention is to provide a catalyst for hydrogen peroxide decomposition with which hydrogen peroxide present in water to be treated that contains an acid in a high concentration can be efficiently decomposed at low cost and which is less apt to dissolve away in the water being treated, can be stably used over a long period, and renders acid recovery and recycling possible. Another object is to provide a process for producing the catalyst and a method for decomposing hydrogen peroxide using the catalyst.

Means for Solving the Problems

The present inventors diligently made investigations and, as a result, have discovered that the problems can be overcome by using amorphous metals as the catalyst layer of a catalyst for hydrogen peroxide decomposition. The present invention has been thus completed.

The present invention is as follows.

1. A catalyst for hydrogen peroxide decomposition for use in decomposing hydrogen peroxide present in acid-containing water to be treated, comprising:
    a base; and
    a catalyst layer that is amorphous, comprises a platinum-group metal having catalytic function and a Group-6 element metal having catalytic function and is formed over the base.
2. The catalyst for hydrogen peroxide decomposition as described in 1. above, wherein the catalyst layer is formed over the base, via an interlayer.
3. The catalyst for hydrogen peroxide decomposition as described in 1. or 2. above, wherein a mass content ratio of the platinum-group metal to the Group-6 element metal is 99:1 to 70:30.
4. The catalyst for hydrogen peroxide decomposition as described in any one of 1. to 3. above,
    wherein the platinum-group metal is at least one metal selected from the group consisting of Pt, Pd, Ru, Ir, and Rh.
5. The catalyst for hydrogen peroxide decomposition as described in any one of 1. to 4. above,
    wherein the Group-6 element metal is at least one metal selected from the group consisting of Mo and W.
6. The catalyst for hydrogen peroxide decomposition as described in any one of 1. to 5. above,
    wherein the amorphous catalyst layer is configured of metals comprising any one combination selected from among: Pd and Mo; Ru and Mo; Pt and W; and Jr and W.
7. The catalyst for hydrogen peroxide decomposition as described in any one of 1. to 6. above,
    wherein the base comprises at least one metal selected from the group consisting of Ta, Nb, Zr, and Ti.
8. The catalyst for hydrogen peroxide decomposition as described in any one 1. to 7. above,
    wherein the base has a shape which is any one of a platy shape, a net shape, a punching metal, and an expanded metal.
9. The catalyst for hydrogen peroxide decomposition as described in any one of 2. to 8. above,
    wherein the interlayer comprises a noble metal.
10. The catalyst for hydrogen peroxide decomposition as described in 9. above,
    wherein the noble metal is a platinum-group metal or Au.
11. The catalyst for hydrogen peroxide decomposition as described in any one of 2. to 10. above,
    wherein the interlayer has a thickness of 0.1-10 μm.
12. A method for decomposing hydrogen peroxide contained in water to be treated, comprising:
    using the catalyst for hydrogen peroxide decomposition as described in one of 1. to 11. above.
13. The method for decomposing hydrogen peroxide as described in 12. above,
    wherein the water to be treated has the hydrogen peroxide concentration of 0.1-10% by mass.
14. The method for decomposing hydrogen peroxide as described in 12. or 13. above,
    wherein the water to be treated contains an acid in a concentration of 5-75% by mass.
15. The method for decomposing hydrogen peroxide as described in 14. above,
    wherein the acid is sulfuric acid.
16. A process for producing a catalyst for hydrogen peroxide decomposition, comprising:

a step of forming a catalyst layer that is amorphous and comprises a platinum-group metal having catalytic function and a Group-6 element metal having catalytic function over a base by forming a coating film over the base by plating method.
17 The process for producing a catalyst for hydrogen peroxide decomposition as described in 16. above, further comprising:
    a step of forming an interlayer on the base by forming a coating film on the base by plating method for forming the amorphous catalyst layer on the interlayer.

Effects of the Invention

The catalyst for hydrogen peroxide decomposition of the invention includes a base and a catalyst layer formed over the base, and is characterized in that the catalyst layer includes amorphous metals. Because of this, hydrogen peroxide can be efficiently decomposed at low cost without necessitating application of a chemical, e.g., sulfurous acid, light irradiation, steam, high pressure, or the like. In addition, the catalyst is less apt to dissolve away in the water being treated, and can be stably used over a long period. Furthermore, it is possible to recover the acid from the treated water which has undergone the hydrogen peroxide decomposition and to recycle the recovered acid. In cases when this acid is high-concentration sulfuric acid, highly excellent recyclability is attained.

BRIEF DESCRIPTION OF THE DRAWINGS

FIG. 1 shows the results of an analysis by XRD of the catalyst of Example 1 or Comparative Example 1.

FIG. 2 is a view which diagrammatically shows the overview system configuration of a waste liquid treatment system including a waste liquid treatment device.

FIG. 3 is a schematic view which roughly shows the internal structure of the waste liquid treatment device.

FIG. 4 is graphs which each show the concentrations of residual hydrogen peroxide in water to be treated by bringing the catalyst of Example 1 or Comparative Example 1 into contact with water to be treated.

FIG. 5 is a view which diagrammatically shows the overview system configuration of a waste liquid treatment system including a waste liquid treatment device.

FIG. 6 is a schematic view which roughly shows the internal structure of the waste liquid treatment device.

MEANS FOR CARRYING OUT THE INVENTION

The present invention is explained below in more detail. The catalyst for hydrogen peroxide decomposition (hereinafter also referred to simply as "catalyst") of the invention includes a base and a catalyst layer formed over the base, and is characterized in that the catalyst layer includes amorphous metals.

First, the catalyst of the invention is explained.

The catalyst of the invention is a catalyst for hydrogen peroxide decomposition for use in decomposing hydrogen peroxide present in acid-containing water to be treated, and the catalyst includes a base and a catalyst layer that is amorphous, includes a platinum-group metal having catalytic function and a Group-6 element metal having catalytic function and is formed over the base.

It is preferable that the base to be used in the invention should be a metal plate, from the standpoint that it is easy to form the amorphous metallic catalyst layer. Examples of the metal plate include metal plates including Fe and alloys thereof, Ni and alloys thereof, Cu and alloys thereof, Al and alloys thereof, Ti and alloys thereof, Ta, Nb, and Zr. Metal plates including at least one metal selected from the group consisting of Ta, Nb, Zr, and Ti are preferred from the standpoint that these metal plates have resistance to corrosion by high-concentration acids. Especially in the case where the water to be treated has an acid concentration, e.g., sulfuric acid concentration, of 60% by mass or higher, it is preferred to use a metal plate including at least one metal selected from the group consisting of Ta, Nb, and Zr.

The shape of the base is not particularly limited, and is suitably selected in accordance with the shape, size, etc. of the device to be used for the decomposition of hydrogen peroxide. Examples thereof include shapes such as a platy shape, a net shape, a punching metal, and an expanded metal. A platy shape is preferred of these from the standpoint that the frequency and period of contact between water to be treated and the catalyst can be increased in accordance with catalyst loading methods.

The thickness of the base is, for example, preferably 3 mm or less, more preferably 0.5-1 mm.

The catalyst layer in the invention is amorphous. Because the catalyst layer of the catalyst of the invention is amorphous, the hydrogen peroxide in the water to be treated can be efficiently decomposed. It is thought that in cases when the platinum-group metal is subjected to electroplating together with a Group-6 element metal, which is unable to be deposited when used alone, to thereby cause inductive co-deposition, the crystal structure of the Pt changes. Furthermore, the reason why the catalyst is less apt to dissolve away in the water being treated and can be stably used over a long period is thought to be that the catalyst layer formed has corrosion resistance.

The term "amorphous" means a solid state in which the arrangement of constituent atoms has no long-range regularity such as that of crystalline structures. That a catalyst layer is amorphous can be ascertained from the results of X-ray diffractometry in which the peak in the waveform that is assigned to a crystal plane of the platinum-group metal has become lower or broader.

The amorphous catalyst layer is configured of a platinum-group metal having catalytic function and a Group-6 element metal having catalytic function.

Examples of the platinum-group metals include at least one metal selected from the group consisting of Pt, Pd, Ru, Ir, and Rh, from the standpoint of catalytic activity. Pt is preferred of these from the standpoints of catalytic activity in hydrogen peroxide decomposition and resistance to corrosion by high-concentration acids.

Examples of the Group-6 element metal in the invention include at least one metal selected from the group consisting of Mo and W, from the standpoint of catalytic activity.

The content ratio between the platinum-group metals and the Group-6 element metals, in terms of the ratio of the content by mass of the deposit of the former to the content by mass of the deposit of the latter (mass content ratio), is preferably from 99:1 to 70:30, more preferably from 90:10 to 80:20, from the standpoint of catalytic activity. In cases when the catalyst layer has such content ratio, this amorphous metal catalyst can have even better catalytic activity.

With respect to combinations of the platinum-group metal and the Group-6 element metal, any of the following combinations is preferred from the standpoint that the catalytic activity is further enhanced: Pd and Mo; Ru and Mo; Pt and W; and Ir and W.

The thickness of the catalyst layer is, for example, preferably 0.1-5 μm, more preferably 0.3-1 μm. This is because the catalyst layer, even when having a small thickness within that range, has catalytic activity.

It is preferable in the catalyst of the invention that an interlayer should be disposed between the base and the catalyst layer for the purposes of, for example, protecting the base from acids and enhancing bonding between the base and the catalyst layer. From the standpoint of achieving the purposes, it is preferable that the interlayer includes a noble metal and that the noble metal be a platinum-group metal or Au. It is especially preferable that the platinum-group metal should be Pt.

The thickness of the interlayer is preferably 0.1-10 μm, more preferably 0.5-5 μm, from the standpoints of protecting the base from acids and enhancing bonding between the base and the catalyst layer. This is because by regulating the thickness of the interlayer to a value within that range, the interlayer is rendered effective in preventing the base from corroding.

The thickness of the interlayer can be varied in accordance with the acid concentration of the water to be treated.

The interlayer may be constituted of one layer, or may be composed of a plurality of layers.

Next, a process for producing the catalyst of the invention is explained.

The catalyst of the invention can be produced, for example, through a step in which a coating film is formed on a base by plating, sputtering, or vapor deposition to form an amorphous catalyst layer, specifically a catalyst layer including amorphous metals. A preferred method for forming the coating film on the base is plating. This is because the coating film, which is for preventing the base from corroding, can be deposited thick (1-10 μm) in a short time. Examples of the plating include electroplating and electroless plating. Electroplating is preferred of these. A method of electroplating suitable for the present invention is explained below.

First, a plating solution containing, for example, both the platinum-group element and the Group-6-element metal is prepared. It is preferable that the platinum-group element in the plating solution should have been dissolved as a chloride, sulfuric acid compound, nitric acid compound, or amine complex in the aqueous solution, and it is preferable that the Group-6 element metal should have been dissolved in the form of a complex formed from a complexing agent and a compound containing the metal, in the aqueous solution. The complex can be prepared by a known method.

The concentration of the platinum-group element in the electroplating solution is, for example, 0.1-1% by mass, more preferably 0.2-0.5% by mass. The concentration of the Group-6 element metal in the electroplating solution is, for example, preferably 1.0-10% by mass.

The concentration of the complexing agent in the plating solution is, for example, preferably 0.5-5% by mass. Preferred as the complexing agent is an organic acid or an amine compound. Preferred as the organic acid is a hydroxy acid. As the amine compound, it is preferred to use EDTA or a sulfamic acid.

The pH of the electroplating solution containing the platinum-group element and Group-6 element metal dissolved therein may be suitably regulated in accordance with the kinds of the elements used. However, the pH thereof is, for example, 1.5-10.

Electroplating conditions may be suitably regulated in accordance with the kinds of the elements used. For example, the current density is 0.1-5 A/dm$^2$, the plating period is 1-30 minutes, and the plating temperature is 40-80° C.

Whether a catalyst layer is amorphous can be assessed by an analysis based on X-ray diffractometry (XRD).

A preferred embodiment of the catalyst of the invention is one in which, as stated above, the catalyst layer has been formed over the surface of a base, via an interlayer. This interlayer can be disposed by forming a coating film by the plating described above (electroplating or electroless plating) or by sputtering or vapor deposition. An embodiment in which the interlayer includes a noble metal is explained below, but the invention should not be construed as being limited to the following.

Examples of methods for forming an interlayer include a method in which a base is subjected to degreasing, immersion for acid treatment (e.g., a fluoride-based acid), etc. to activate the surface of the base and a coating film of a noble metal is formed on the base by electroplating.

In the case of electroplating, for example, the concentration of the noble metal in the plating solution is preferably 0.5-1.0% by mass. The pH of the plating solution is preferably 1.5-10. The plating conditions include, for example, a current density of 0.2-2 A/dm$^2$, a period of 5-40 minutes, and a temperature of 50-70° C. It is preferable that after the plating, the base should be rinsed with water and dried.

Next, a method in which the catalyst of the invention is used to decompose hydrogen peroxide contained in water to be treated is explained.

Even in the case where both an acid and hydrogen peroxide are present in the water to be treated, the catalyst of the invention is capable of efficiently decomposing the hydrogen peroxide. In addition, after the decomposition of the hydrogen peroxide, the acid can be recovered and recycled as such.

The water to be treated is not particularly limited, and examples thereof include waste liquids resulting from pretreatment of silicon wafers, etc.

Examples of the acid include sulfuric acid.

The following explanation is made on the case where the acid is sulfuric acid. In the present invention, the concentration of sulfuric acid in the water to be treated can be either 5-70% by mass or a high concentration of 70-75% by mass. The concentration of sulfuric acid in the water to be treated is preferably 5-75% by mass, more preferably 50-75% by mass, from the standpoint that the catalyst of the invention is capable of efficiently decomposing the hydrogen peroxide even in high-concentration sulfuric acid and is highly effective.

Meanwhile, the concentration of hydrogen peroxide in the water to be treated can be 0.1-10% by mass. It is preferable that the concentration of hydrogen peroxide in the water to be treated should be 1-10% by mass, from the standpoint that the catalyst of the invention is highly effective and is capable of highly efficiently decomposing the hydrogen peroxide even when the hydrogen peroxide is contained in a high concentration.

As described above, even when the water to be treated has a high sulfuric acid concentration and a high hydrogen peroxide concentration, the hydrogen peroxide can be efficiently decomposed with the catalyst of the invention.

For bringing the water to be treated into contact with the catalyst of the invention, a known means may be utilized without particular limitations. Examples thereof include a method in which catalysts of the invention are mounted in a catalytic reactor, such as a flow-through type reactor in which water is passed between the catalysts, and water to be treated which contains both hydrogen peroxide and sulfuric acid is thereafter supplied to and passed through the reactor, thereby bringing the water to be treated into contact with the catalysts. Specific examples thereof include the waste liquid treatment systems which will be described later in the Examples.

The temperature of the water to be treated which is to be supplied to the catalytic reactor is not particularly limited. The higher the water temperature, the higher the ability to decompose the hydrogen peroxide. However, there is no need of heating the water. In cases when the reactor has a heat insulating structure for preventing the water temperature from declining, the ability to decompose the hydrogen peroxide improves. Usually, the temperature of the water is preferably in the range of 1050° C.

The amount of the catalyst of the invention to be used is suitably determined in accordance with the concentrations of sulfuric acid and hydrogen peroxide in the water to be treated. For example, in the case where the sulfuric acid concentration is 50-70% by mass and the hydrogen peroxide concentration is 1-5% by mass, an appropriate range of the surface area of the catalyst to be used is 0.5-1.5 m$^2$ per 100 L of the water to be treated.

By the catalyst of the invention, the hydrogen peroxide is decomposed into water and oxygen.

The treated water in which the hydrogen peroxide has been decomposed can be recycled (reused or sold) as such as sulfuric acid.

EXAMPLES

The present invention is further explained below by reference to Examples, but the invention should not be construed as being limited to the following Examples.

Example 1

(Base)

A plate made of Zr and having a rectangular shape of 50 mm (width)×70 mm (thickness)×1 mm (length) was used as a base.

(Plating Solution for Forming Amorphous Catalyst Layer)

A plating solution containing 0.3% by mass Pt and 6.0% by mass W and having a pH of 7 was prepared. The plating solution was obtained by dissolving chloroplatinic acid and sodium tungstate respectively as Pt and W sources in water.

(Plating Solution for Interlayer Formation)

As the plating solution, use was made of a neutral solution manufactured by EEJA (product: Au plating solution in Temperex Series).

(Pretreatment of the base)

The base was subjected successively to degreasing with a commercial alkali and an immersion treatment with a fluoride-based acid, thereby activating the surface of the base.

(Formation of Interlayer)

The pretreated base was subjected to electroplating using the plating solution for interlayer formation. The electroplating conditions included a current density of 0.5 A/dm$^2$, a period of 3 minutes, and a temperature of 60° C. An interlayer having a thickness of 3 μm was formed on the surface of the base.

(Formation of Amorphous Catalyst Layer)

The base on which the interlayer had been formed was subsequently rinsed with water, without being dried, and then subjected to electroplating using the plating solution for catalyst layer formation. The electroplating conditions included a current density of 0.5 A/dm$^2$, a period of 5 minutes, and a temperature of 65° C. After completion of the electroplating, the base was rinsed with water and dried. It was ascertained that a catalyst layer having a thickness of 0.3 µm had been formed on the interlayer.

In the manner shown above, a catalyst of the invention 5 was produced.

The catalyst layer was analyzed by XRD (ULTIMA IV, manufactured by Rigaku Corp.) and, as a result, the catalyst layer was ascertained to be constituted of an amorphous metal layer. The results are shown in FIG. 1.

It can be seen from FIG. 1 that the catalyst layer of Example 1 gave a waveform in which the peaks assigned to respective Pt crystal planes had enlarged half-value widths and, hence, the catalyst layer of Example 1 was amorphous.

(Ascertainment of Hydrogen Peroxide Decomposition Performance)

The hydrogen peroxide decomposition performance of the catalyst of the invention was ascertained using the waste liquid treatment system 100 shown in FIG. 2.

1. Catalysts, each of which was the catalyst of Example 1 produced in the manner described above, were loaded in the manner shown in FIG. 3 at a catalyst-to-catalyst spacing of 5 mm so as to result in each of the catalyst surface areas shown in Table 2. The waste liquid treatment device 20 shown in FIG. 3 is configured of: an introduction port 21 for introducing water to be treated which has flowed from a first reservoir tank 10; partition panels 22 for making the catalyst surfaces which come into contact with the water to be treated have a given area; catalysts 23 disposed at a catalyst-to-catalyst spacing 24; a discharge port 26 for treated water; etc.

2. Water to be treated which had a sulfuric acid concentration of 71% by mass and a hydrogen peroxide concentration of 1.65% by mass was supplied to the first reservoir tank 10 and passed through the waste liquid treatment device 20 under the flow conditions shown in Table 1, thereby bringing the water to be treated into contact with the solid catalysts to ascertain the hydrogen peroxide decomposition performance of the catalysts of the invention. Specifically, the water to be treated which has flowed into the device through the introduction port 21 overflows the partition panel 22 disposed adjacently to the introduction port 21. The water to be treated which has overflowed the partition panel 22 moves in the waste liquid treatment device 20 along the loading direction of catalysts 23 shown by the arrow in FIG. 3, while coming into contact with the catalysts 23, and is then discharged through the discharge port 26. The level of the liquid surface 25 of the water to be treated is substantially equal to the height of the partition panels 22.

3. The treated water which had passed through the waste liquid treatment device 20 was stored in a second reservoir tank 30.

The results of an examination of the treated water for the concentration of residual hydrogen peroxide are shown in Table 2 and FIG. 4.

Comparative Example 1 (Base)

A plate made of Zr and having a rectangular shape of 50 mm (length)×70 mm (width)×1 mm (thickness) was used as a base, as in Example 1.

(Plating Solution for Forming Crystalline Catalyst Layer)

A commercial plating solution containing 0.5% by mass Pt and having a pH of 1 was prepared.

(Pretreatment of the Base)

As in Example 1, the base was subjected successively to degreasing with a commercial alkali, an immersion treatment with a fluoride-based acid, etc., thereby activating the surface of the base.

(Formation of Crystalline Catalyst Layer)

The base which had been activated was subjected to electroplating using the plating solution for catalyst layer formation. The electroplating conditions included a current density of 0.5 A/dm$^2$, a period of 60 minutes, and a temperature of 60° C. After completion of the electroplating, the base was rinsed with water and dried. It was ascertained that a catalyst layer having a thickness of 2 µm had been formed on the base.

The catalyst layer was analyzed by XRD (ULTIMA IV, manufactured by Rigaku Corp.) and, as a result, the catalyst layer was ascertained to be constituted of a crystalline metal layer. The results are shown in FIG. 1.

It can be seen from FIG. 1 that the catalyst layer of Comparative Example 1 gave a waveform in which the peaks assigned to respective Pt crystal planes were sharp and had narrow half-value widths and, hence, the catalyst layer of Comparative Example 1 was crystalline.

(Ascertainment of Hydrogen Peroxide Decomposition Performance)

The hydrogen peroxide decomposition performance of the catalyst was ascertained in the same manner as in Example 1, except that the crystalline catalyst produced in Comparative Example 1 was used and that water to be treated which had a hydrogen peroxide concentration of 1.78% by mass was used.

The results are shown in Table 2 and FIG. 4.

TABLE 1

| Flow conditions | Flow rate [mL/min] | 8 |
| --- | --- | --- |
| | Face velocity [mL/cm$^2$ · min] | 0.32 |
| | Liquid surface level [mm] | 25 |
| | Liquid temperature [° C.] | 25 |

TABLE 2

| | | | Catalyst surface area [cm$^2$] | | | | | | | |
| --- | --- | --- | --- | --- | --- | --- | --- | --- | --- | --- |
| | | | 0 | 115 | 161 | 230 | 322 | 460 | 644 | 690 |
| Example 1 | Concentration of residual H$_2$O$_2$ | [mg/L] | 16,500 | 9,900 | 7,500 | 4,600 | 2,900 | 1,700 | 850 | 700 |
| | | mass % | 1.65 | 0.99 | 0.75 | 0.46 | 0.29 | 0.17 | 0.085 | 0.070 |
| Comparative Example 1 | Concentration of residual H$_2$O$_2$ | [mg/L] | 17,800 | 13,000 | 12,700 | 12,200 | 12,200 | 11,600 | 10,200 | 9,700 |
| | | mass % | 1.78 | 1.30 | 1.27 | 1.22 | 1.22 | 1.16 | 1.02 | 0.97 |

It was found from the results given in Table 2 and FIG. 4 that the catalyst of Example 1, which includes amorphous metals, has far higher hydrogen peroxide decomposition performance than the crystalline catalyst of Comparative Example 1, which includes no amorphous metal.

Examples 2 and 3

The hydrogen peroxide decomposition performance of catalysts was ascertained in the same manner as in Example 1, except that the water to be treated had the sulfuric acid concentrations shown in Table 3 and that the catalyst surface areas shown in Table 3 were used to conduct the water treatment. The results are shown in Table 3.

TABLE 3

| | Sulfuric acid concentration [mass %] | | | Catalyst surface area [cm$^2$] | | | | | |
|---|---|---|---|---|---|---|---|---|---|
| | | | | 0 | 115 | 161 | 230 | 322 | 460 |
| Example 2 | 8 | Concentration of residual H$_2$O$_2$ | [mg/L] mass % | 17,800 1.78 | 2,200 0.22 | 1,400 0.14 | 900 0.09 | 600 0.06 | 400 0.04 |
| Example 3 | 44 | Concentration of residual H$_2$O$_2$ | [mg/L] mass % | 16,800 1.68 | 5,800 0.58 | 3,700 0.37 | 2,000 0.20 | 1,200 0.12 | 650 0.07 |

| | Sulfuric acid concentration [mass %] | | | Catalyst surface area [cm$^2$] | | | | | |
|---|---|---|---|---|---|---|---|---|---|
| | | | | 644 | 690 | 805 | 920 | 966 | 1,150 |
| Example 2 | 8 | Concentration of residual H$_2$O$_2$ | [mg/L] mass % | 200 0.02 | 170 0.017 | 140 0.014 | 120 0.012 | 100 0.010 | 40 0.004 |
| Example 3 | 44 | Concentration of residual H$_2$O$_2$ | [mg/L] mass % | 370 0.04 | 340 0.034 | 270 0.027 | 200 0.020 | 200 0.020 | 170 0.017 |

It was found from the results given in Table 3 that even in the case where the water to be treated has low sulfuric acid concentrations, such as 8% in Example 2 and 44% in Example 3, as compared with Example 1, in which the water to be treated had a sulfuric acid concentration of 71%, the hydrogen peroxide contained in the water to be treated can be decomposed as in Example 1 by using the catalyst including amorphous metals. It was thus found that according to the catalyst of the invention, the hydrogen peroxide contained in water to be treated can be efficiently decomposed regardless of whether the sulfuric acid concentration in the water to be treated is low or high.

Example 4

(Base)
A plate made of Zr (punching metal) which had a rectangular shape of 48 mm (length)×80 mm (width)×0.7 mm (thickness) and in which holes having a diameter of 3 mm with an interval of 6 mm had been formed by punching was used as a base.
(Plating Solution for Forming Amorphous Catalyst Layer)
A plating solution containing 0.3% by mass Pt and 6.0% by mass W and having a pH of 7 was prepared as in Example 1. The plating solution was obtained by dissolving chloroplatinic acid and sodium tungstate respectively as Pt and W sources in water.
(Plating Solutions for Interlayer Formation)
As the plating solutions, use was made of an acidic Pt plating solution and a neutral Au plating solution manufactured by EEJA (product: Temperex 401).

(Pretreatment of the Base)
The base was subjected successively to degreasing with a commercial alkali, an immersion treatment with a fluoride-based acid, etc., thereby activating the surface of the base.
(Formation of Interlayer)
The pretreated base was subjected to interlayer formation in two stages, in which electroplating using the Pt plating solution was conducted as the first stage. The electroplating conditions included a current density of 0.5 A/dm$^2$, a period of 8 minutes, and a temperature of 50° C. A first-stage interlayer having a thickness of 0.3 µm was formed on the base surface. As the second stage, electroplating using the Au plating solution was conducted. The electroplating conditions included a current density of 0.3 A/dm$^2$, a period of 5 minutes, and a temperature 60° C. A second-stage interlayer having a thickness of 0.5 µm was formed over the base surface.
(Formation of Amorphous Catalyst Layer)
The base on which the interlayer had been formed was subsequently rinsed with water, without being dried, and then subjected to electroplating using the plating solution for catalyst layer formation. The electroplating conditions included a current density of 0.5 A/dm$^2$, a period of 5 minutes, and a temperature of 65° C. After completion of the electroplating, the base was rinsed with water and dried. It was ascertained that a catalyst layer having a thickness of 0.3 µm had been formed on the interlayer.

In the manner shown above, a catalyst of the invention was produced.
(Ascertainment of Hydrogen Peroxide Decomposition Performance)
The hydrogen peroxide decomposition performance of the catalyst of the invention was ascertained using the waste liquid treatment system 200 shown in FIG. 5.

1. Catalysts, each of which was the catalyst of Example 4 produced in the manner described above, were loaded into a waste liquid treatment device 120 included in the waste liquid treatment system 200 shown in FIG. 5, at a catalyst-to-catalyst spacing of 5 mm so as to result in each of the catalyst surface areas shown in Table 5. As shown in FIG. 6, the waste liquid treatment device 120 is configured of: a housing 121; an introduction port 21 for introducing water to be treated which has flowed from a first reservoir tank 110; a baffle plate 122 for evenly bringing the water into contact with catalysts; the catalysts 23; a partition panel 124 for setting the catalysts in two stages; a discharge port 26 for treated water; etc.

2. Water to be treated which had a sulfuric acid concentration of 71% by mass and a hydrogen peroxide concentration of 1.80% by mass was supplied to the first reservoir tank 110 and passed through the waste liquid treatment device 120 under the flow conditions shown in Table 4, thereby bringing the water to be treated into contact with the solid catalysts to ascertain the hydrogen peroxide decomposition performance of the catalysts of the invention. Specifically, as shown in FIG. 6, the water to be treated which has flowed into the device through the introduction port 21 passes through the baffle plate 122, which has been disposed adjacently to the introduction port 21. The water to be treated which has passed through the baffle plate 122 moves in the waste liquid treatment device 120 from the bottom of the waste liquid treatment device 120 toward the upper part thereof (along the direction shown by the arrow in FIG. 6), while coming into contact with the catalysts 23, and is then discharged through the discharge port 26.

3. The treated water which had passed through the waste liquid treatment device 120 was stored in a second reservoir tank 130.

The results of an examination of the treated water for the concentration of residual hydrogen peroxide are shown in Table 5.

TABLE 4

| Flow conditions | Flow rate [mL/min] | 32 |
| --- | --- | --- |
| | Face velocity [mL/cm$^2$ · min] | 0.42 |
| | Liquid temperature [° C.] | 24 |

TABLE 5

| | | Catalyst contact area [cm$^2$] | | | |
| --- | --- | --- | --- | --- | --- |
| | | 0 | 2400 | 4800 | 7200 |
| Example 4 | Concentration of residual H$_2$O$_2$ [mg/L] | 18000 | 4600 | 1500 | 800 |
| | mass % | 1.800 | 0.460 | 0.150 | 0.080 |

It was found from the results given in Table 5 that even in the case where the waste liquid treatment system has a modified device shape, the hydrogen peroxide contained in water to be treated can be efficiently decomposed as in Example 1 by using the catalyst for hydrogen peroxide decomposition of the invention, which has an amorphous catalyst layer.

Examples 5 and 6

(Base)

An expanded metal made of Ti which had dimensions of 48 mm (length)×80 mm (width)×0.7 mm (thickness) was used as a base.

(Plating Solution for Forming Amorphous Catalyst Layer)

A plating solution containing 0.3% by mass Pt and 6.0% by mass W and having a pH of 7 was prepared as in Example 1. The plating solution was obtained by dissolving chloroplatinic acid and sodium tungstate respectively as Pt and W sources in water.

(Plating Solutions for Interlayer Formation)

As the plating solutions, use was made of an acidic Pt plating solution and a neutral Au plating solution manufactured by EEJA (product: Aurobond Tenn.).

(Pretreatment of the Base)

The base was subjected successively to degreasing with a commercial alkali, an immersion treatment with a fluoride-based acid, etc., thereby activating the surface of the base.

(Formation of Interlayer)

The pretreated base was subjected to electroplating using the Pt plating solution for interlayer formation. The electroplating conditions included a current density of 0.5 A/dm$^2$, a period of 40 minutes, and a temperature of 50° C. An interlayer having a thickness of 1 μm was formed on the base surface. Furthermore, electroflashing using the Au plating solution for interlayer formation was conducted to deposit a layer on the 1-μm Pt deposit interlayer. The conditions included a voltage of 5 V, a period of 0.5 minutes, and a temperature 60° C.

(Formation of Amorphous Catalyst Layer)

The base on which the interlayer had been formed was subsequently rinsed with water, without being dried, and then subjected to electroplating using the plating solution for catalyst layer formation. The electroplating conditions included a current density of 0.5 A/dm$^2$, a period of 5 minutes, and a temperature of 65° C. After completion of the electroplating, the base was rinsed with water and dried. It was ascertained that a catalyst layer having a thickness of 0.3 μm had been formed on the interlayer.

In the manner shown above, a catalyst of the invention was produced.

(Ascertainment of Hydrogen Peroxide Decomposition Performance)

As in Example 1, the hydrogen peroxide decomposition performance of the catalyst of the invention was ascertained using the waste liquid treatment system 100 shown in FIG. 2.

1. Catalysts, each of which was produced in the manner described above, were loaded in the manner shown in FIG. 3 at a catalyst-to-catalyst spacing of 5 mm so as to result in each of the catalyst surface areas shown in Table 7.

2. Water to be treated which had a sulfuric acid concentration of 71% by mass and a hydrogen peroxide concentration of 1.80% by mass (Example 5; initial liquid temperature, 13° C.: Example 6; initial liquid temperature, 25° C.) was supplied to the first reservoir tank 10 and passed through the waste liquid treatment device 20 under the flow conditions shown in Table 6, thereby bringing the water to be treated into contact with the solid catalysts to ascertain the hydrogen peroxide decomposition performance of the catalysts of the invention. Specifically, the water to be treated which has flowed into the device through the introduction port 21 overflows the partition panel 22 disposed adjacently to the introduction port 21. The water to be treated which has overflowed the partition panel 22 moves in the waste liquid treatment device 20 along the loading direction of catalysts 23 shown by the arrow in FIG. 3, while coming into contact with the catalysts 23, and is then discharged through the discharge port 26.

3. The treated water which had passed through the waste liquid treatment device 20 was stored in the second reservoir tank 30.

The results of an examination of the treated water for the concentration of residual hydrogen peroxide are shown in Table 7.

TABLE 6

| Flow conditions | Flow rate [mL/min] | 32 |
|---|---|---|
| | Face velocity [mL/cm$^2$ · min] | 0.53 |
| | Liquid surface level [mm] | 50 |
| | Liquid temperature [° C.] | 13° C. or 25° C. |

TABLE 7

| | Liquid temperature | | | Catalyst contact area [cm$^2$] | | | | |
|---|---|---|---|---|---|---|---|---|
| | | | | 0 | 3000 | 6000 | 9000 | 12000 |
| Example 5 | 13° C. | Concentration of residual H$_2$O$_2$ | [mg/L] | 18000 | 5000 | 2200 | 900 | 500 |
| | | | mass % | 1.8 | 0.5 | 0.22 | 0.09 | 0.05 |
| Example 6 | 25° C. | Concentration of residual H$_2$O$_2$ | [mg/L] | 18000 | 2900 | 600 | 200 | 50 |
| | | | mass % | 1.8 | 0.29 | 0.06 | 0.02 | 0.005 |

It was found from the results given in Table 7 that although the difference in initial liquid temperature results in a difference in the efficiency of hydrogen peroxide treatment, the hydrogen peroxide contained in the water to be treated can be efficiently decomposed as in Example 1, even in the case where the catalyst shape in Example 1 has been changed, by using the catalyst including amorphous metals.

Example 7

(Base)

A plate made of Nb having a rectangular shape of 46 mm (width)×70 mm (length)×0.7 mm (thickness) was used as a base.

(Plating Solution for Forming Amorphous Catalyst Layer)

A plating solution containing 0.3% by mass Pt and 6.0% by mass W and having a pH of 7 was prepared as in Example 1. The plating solution was obtained by dissolving chloroplatinic acid and sodium tungstate respectively as Pt and W sources in water.

(Plating Solution for Interlayer Formation)

As the plating solution, use was made of an acidic Pt plating solution.

(Pretreatment of the Base)

The base was subjected successively to degreasing with a commercial alkali, an immersion treatment with a fluoride-based acid, etc., thereby activating the surface of the base.

(Formation of Interlayer)

The pretreated base was subjected to electroplating using the Pt plating solution for interlayer formation. The electroplating conditions included a current density of 0.5 A/dm$^2$, a period of 40 minutes, and a temperature of 50° C. An interlayer having a thickness of 1 μm was formed on the base surface.

(Formation of Amorphous Catalyst Layer)

The base on which the interlayer had been formed was subsequently rinsed with water, without being dried, and then subjected to electroplating using the plating solution for catalyst layer formation. The electroplating conditions included a current density of 0.5 A/dm$^2$, a period of 5 minutes, and a temperature of 65° C. After completion of the electroplating, the base was rinsed with water and dried. It was ascertained that a catalyst layer having a thickness of 0.3 μm had been formed on the interlayer.

In the manner shown above, a catalyst of the invention was produced.

(Ascertainment of Hydrogen Peroxide Decomposition Performance)

As in Example 1, the hydrogen peroxide decomposition performance of the catalyst of the invention was ascertained using the waste liquid treatment system 100 shown in FIG. 2.

1. Catalysts, each of which was the catalyst of Example 7 produced in the manner described above, were loaded in the manner shown in FIG. 3 at a catalyst-to-catalyst spacing of 5 mm so as to result in each of the catalyst surface areas shown in Table 9.

2. Water to be treated which had a sulfuric acid concentration of 16% by mass and a hydrogen peroxide concentration of 3.76% by mass was supplied to the first reservoir tank 10 and passed through the waste liquid treatment device 20 under the flow conditions shown in Table 8, thereby bringing the water to be treated into contact with the solid catalysts to ascertain the hydrogen peroxide decomposition performance of the catalysts of the invention. Specifically, the water to be treated which has flowed into the device through the introduction port 21 overflows the partition panel 22 disposed adjacently to the introduction port 21. The water to be treated which has overflowed the partition panel 22 moves in the waste liquid treatment device 20 along the loading direction of catalysts 23 shown by the arrow in FIG. 3, while coming into contact with the catalysts 23, and is then discharged through the discharge port 26.

3. The treated water which had passed through the waste liquid treatment device 20 was stored in the second reservoir tank 30.

The results of an examination of the treated water for the concentration of residual hydrogen peroxide are shown in Table 9.

TABLE 8

| Flow conditions | Flow rate [mL/min] | 32 |
|---|---|---|
| | Face velocity [mL/cm$^2$ · min] | 0.64 |
| | Liquid surface level [mm] | 50 |
| | Liquid temperature [° C.] | 29 |

TABLE 9

| | | | Catalyst contact area [cm$^2$] | | | | | |
|---|---|---|---|---|---|---|---|---|
| | | | 0 | 230 | 322 | 460 | 644 | 920 |
| Example 7 | Concentration of residual H$_2$O$_2$ | [mg/L] mass % | 37600 3.760 | 18300 1.830 | 13800 1.380 | 8900 0.890 | 5100 0.510 | 2800 0.280 |
| | | | Catalyst contact area [cm$^2$] | | | | | |
| | | | 1288 | 1380 | 1610 | 1840 | 1932 | 2300 |
| Example 7 | Concentration of residual H$_2$O$_2$ | [mg/L] mass % | 1500 0.150 | 1300 0.130 | 930 0.093 | 850 0.085 | 820 0.082 | 750 0.075 |

It was found from the results given in Table 9 that even in the case where the water to be treated has a high hydrogen peroxide concentration, such as 3.76% by mass in Example 7, as compared with Examples 1 to 6, the hydrogen peroxide contained in the water to be treated can be decomposed as in Example 1 by using the catalyst including amorphous metals. It was thus found that according to the catalyst of the invention, the hydrogen peroxide contained in water to be treated can be efficiently decomposed even in the case where the water to be treated has a high hydrogen peroxide concentration.

While the invention has been described in detail and with reference to specific embodiments thereof, it will be apparent to one skilled in the art that various changes and modifications can be made therein without departing from the spirit and scope thereof. This application is based on a Japanese patent application filed on Dec. 11, 2014 (Application No. 2014-251315), the entire contents thereof being incorporated herein by reference.

DESCRIPTION OF THE REFERENCE NUMERALS 10, 110. First reservoir tank
20, 120. Waste liquid treatment device
21. Introduction port
22. Partition panel
23. Catalyst
24. Catalyst-to-catalyst spacing
25. Liquid surface
26. Discharge port
30, 130. Second reservoir tank
100, 200. Waste liquid treatment system
121. Housing
122. Baffle plate
124. Partition panel

The invention claimed is:

1. A catalyst for hydrogen peroxide decomposition for use in decomposing hydrogen peroxide present in acid-containing water to be treated containing sulfuric acid in a concentration of 5% mass or more, comprising:
    a base;
    a catalyst layer that is amorphous, comprises a platinum-group metal having catalytic function and a Group-6 element metal having catalytic function and is formed over the base; and
    a corrosion-resisting interlayer consisting of platinum or gold that coats the base and is between the base and catalyst layer, the interlayer having a thickness of 0.1 to 10 μm.

2. The catalyst for hydrogen peroxide decomposition according to claim 1, wherein a mass content ratio of the platinum-group metal to the Group-6 element metal is 99:1 to 70:30.

3. The catalyst for hydrogen peroxide decomposition according to claim 1, wherein the platinum-group metal is at least one metal selected from the group consisting of Pt, Pd, Ru, Ir, and Rh.

4. The catalyst for hydrogen peroxide decomposition according to claim 1, wherein the Group-6 element metal is at least one metal selected from the group consisting of Mo and W.

5. The catalyst for hydrogen peroxide decomposition according to claim 1, wherein the amorphous catalyst layer is configured of metals comprising any one combination selected from among: Pd and Mo; Ru and Mo; Pt and W; and Ir and W.

6. The catalyst for hydrogen peroxide decomposition according to claim 1, wherein the base comprises at least one metal selected from the group consisting of Ta, Nb, Zr, and Ti.

7. The catalyst for hydrogen peroxide decomposition according to claim 1, wherein the base has a shape which is any one of a plate shape, a net shape, a punching metal, and an expanded metal.

8. A method for decomposing hydrogen peroxide contained in water, comprising:
    treating the water with the catalyst according to claim 1, wherein the hydrogen peroxide is decomposed.

9. The method for decomposing hydrogen peroxide according to claim 8, wherein the water to be treated has the hydrogen peroxide concentration of 0.1-10% by mass.

10. The method for decomposing hydrogen peroxide according to claim 8, wherein the water to be treated contains an acid in a concentration of 5-75% by mass.

11. The method for decomposing hydrogen peroxide according to claim 10, wherein the acid is sulfuric acid.

12. A process for producing a catalyst for hydrogen peroxide decomposition, comprising:
    a step of forming a corrosion-resisting interlayer consisting of platinum or gold and having a thickness of 0.1 to 10 μm by forming a coating film on the base by plating; and
    a step of forming a catalyst layer that is amorphous and comprises a platinum-group metal having catalytic function and a Group-6 element metal having catalytic function over the interlayer and the base by forming a coating film by plating.

\* \* \* \* \*